United States Patent
Kono et al.

(10) Patent No.: US 8,712,618 B2
(45) Date of Patent: Apr. 29, 2014

(54) POWER CONVERSION DEVICE FOR ELECTRIC VEHICLE

(75) Inventors: Masaki Kono, Chiyoda-ku (JP); Hideo Okayama, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 218 days.

(21) Appl. No.: 13/503,788

(22) PCT Filed: Dec. 28, 2009

(86) PCT No.: PCT/JP2009/071757
§ 371 (c)(1),
(2), (4) Date: Apr. 24, 2012

(87) PCT Pub. No.: WO2011/080822
PCT Pub. Date: Jul. 7, 2011

(65) Prior Publication Data
US 2012/0209467 A1    Aug. 16, 2012

(51) Int. Cl.
*B60L 9/00*    (2006.01)
(52) U.S. Cl.
USPC ........................................... 701/22
(58) Field of Classification Search
USPC ........................................... 701/22
See application file for complete search history.

(56) References Cited

U.S. PATENT DOCUMENTS 5,977,742 A * 11/1999 Henmi .......................... 318/801
6,042,265 A    3/2000 Kliman et al.

FOREIGN PATENT DOCUMENTS

| JP | 04-096681 A | 3/1992 |
|----|-------------|--------|
| JP | 8-340607 A | 12/1996 |
| JP | 9-177849 A | 7/1997 |
| JP | 11-299300 A | 10/1999 |
| JP | 2000-078744 A | 3/2000 |
| JP | 2003-219504 A | 7/2003 |
| JP | 2004-135418 A | 4/2004 |
| JP | 2005-192301 A | 7/2005 |
| JP | 2006-280142 A | 10/2006 |
| JP | 2007-225226 A | 9/2007 |
| JP | 2008-043069 A | 2/2008 |
| KR | 10-1999-0077797 A | 10/1999 |

OTHER PUBLICATIONS

International Search Report (PCT/ISA/210) issued on Apr. 6, 2010, by Japanese Patent Office as the International Searching Authority for International Application No. PCT/JP2009/071757.

(Continued)

*Primary Examiner* — Thomas Black
*Assistant Examiner* — Luke Huynh
(74) *Attorney, Agent, or Firm* — Buchanan Ingersoll & Rooney PC (57) ABSTRACT

To include a power converter that drives an induction machine and a control unit that controls the, power converter. The control unit includes a drive stopping unit. The drive stopping unit includes a secondary-resistance-temperature detecting unit that detects temperature rise of a secondary resistance of the induction machine based on a current (a d-axis-current detection value and a q-axis-current detection value, or a d-axis current command and a q-axis current command) detected by the induction machine, an inverter angular frequency calculated based on the current, and speed information of an electric vehicle detected by an external-speed-information detecting unit, and the drive stopping unit also includes a drive-stopping-signal output unit that outputs a drive stopping signal for stopping a driving operation of the power converter based on the speed information ωtrain of an electric vehicle and an output (deviation) from the secondary-resistance-temperature detecting unit.

2 Claims, 4 Drawing Sheets

(56) References Cited

OTHER PUBLICATIONS

Written Opinion (PCT/ISA/237) issued on Apr. 6, 2010, by Japanese Patent Office as the International Searching Authority for International Application No. PCT/JP2009/071757.

Decision of a Patent Grant issued on Sep. 27, 2011, by Japanese Patent Office for Application No. 2011-511933 along with English Translation.

The extended European Search Report dated Feb. 27, 2013, issued in corresponding European Patent Application No. 09852800.3. (6 pages).

Office Action (Notice of Preliminary Rejection) issued on Sep. 25, 2013, by the Korean Intellectual Property Office in corresponding Korean Patent Application No. 10-2012-7014032, and an English Translation of the Office Action. (8 pages).

* cited by examiner

POWER CONVERSION DEVICE FOR ELECTRIC VEHICLE

FIELD

The present invention relates to a power conversion device targeting driving of an AC rotating machine used for an electric vehicle, such as a railway vehicle and an electric car, and more particularly to a technique of detecting an abnormal temperature rise of a rotor of a motor to stop an operation of a power converter, thereby preventing the motor from malfunctioning.

BACKGROUND

A motor for a train includes a cooling blower for suppressing a heat generation of a rotor of the motor. Therefore, when a suction port of the blower is clogged, because the cooling efficiency becomes insufficient, the temperature of the rotor of the motor rises, an insulation breakdown of the rotor occurs, and the motor malfunctions in some cases. Accordingly, it is necessary to detect an abnormal temperature rise of a stator or a rotor of a motor that is caused by clogging of a suction port of a blower so as to stop an operation of an inverter, thereby preventing the motor from malfunctioning.

For example, as a conventional technology, Patent Literature 1 mentioned below discloses a method of calculating a temperature of a rotor of an induction motor based on slipping and a current of the motor.

CITATION LIST

Patent Literature

Patent Literature 1: Japanese Patent Application Laid-open No. 2006-280142 (claim 1, [0016], and FIG. 1)

SUMMARY

Technical Problem

However, the calculation method of the temperature of the rotor of the induction motor disclosed in Patent Literature 1 mentioned above is based on an assumption that a speed sensor is incorporated in an induction machine, that is, the method uses a power conversion device that employs control with a speed sensor. Therefore, there is a problem that if there is no speed sensor, a secondary resistance value on the side of the rotor cannot be estimated accurately, and the temperature on the side of the rotor cannot be calculated.

The present invention has been achieved in view of the above problems, and an object of the present invention is to provide a power conversion device for an electric vehicle capable of detecting an abnormal temperature rise of an induction machine in speed sensor-less control of the induction machine.

Solution to Problem

In order to solve above-mentioned problems and achieve the object of the present invention, there is provided a power conversion device for an electric vehicle, including: a power converter that drives an induction machine; and a control unit that controls the power converter, wherein the control unit includes a drive stopping unit, and the drive stopping unit includes a secondary-resistance-temperature detecting unit that detects temperature rise of a secondary resistance of the induction machine based on a current detected by the induction machine, speed information of the induction machine calculated based on the current, and speed information of an electric vehicle detected by an external-speed-information detecting unit, and a drive-stopping-signal output unit that outputs a drive stopping signal for stopping a driving operation of the power converter based on the speed information of the electric vehicle and an output from the secondary-resistance-temperature detecting unit.

Advantageous Effects of Invention

According to the present invention, in the speed sensor-less control of an induction machine, it is possible to detect an abnormal temperature rise of the induction machine.

DESCRIPTION OF EMBODIMENTS

Exemplary embodiments of a power conversion device for an electric vehicle according to the present ivnention will be explained below in detail with reference to the accomapnying drawings. The present invention is not limited to the embodiments.

First Embodiment

Figure 1:
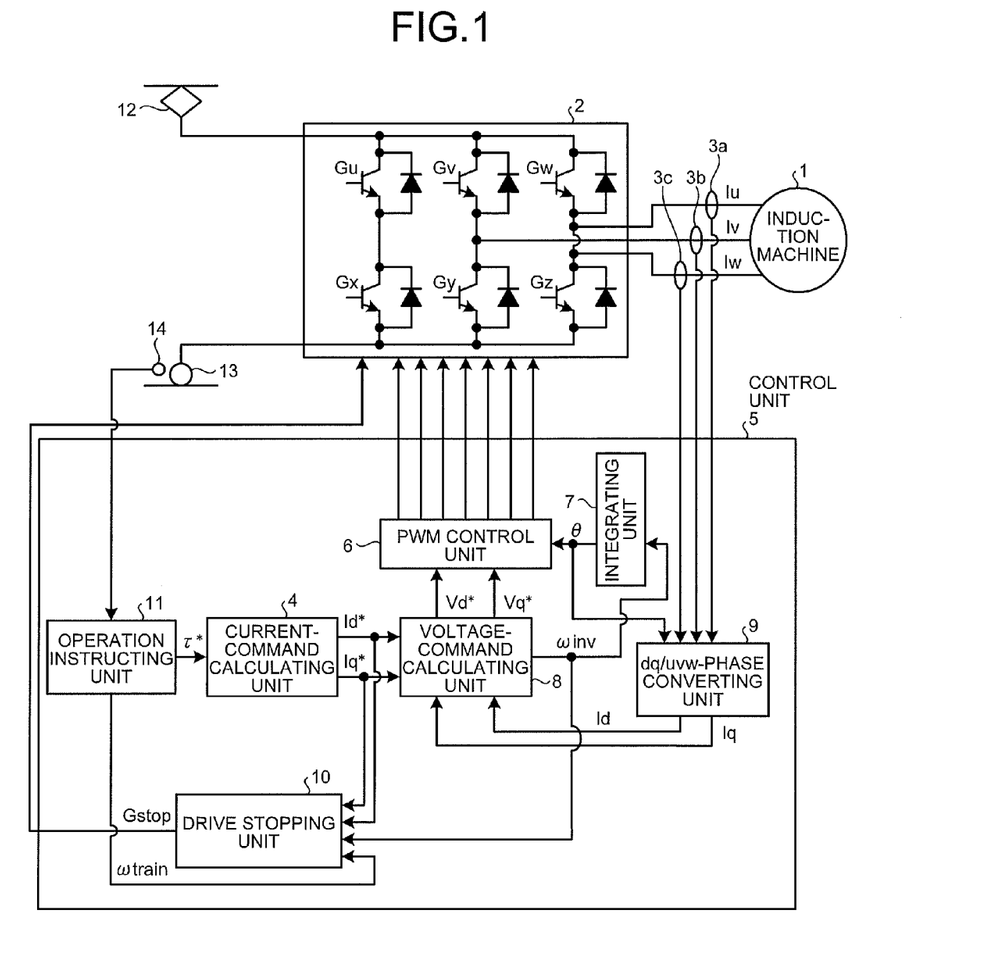
FIG. 1 is a configuration diagram of a power conversion device according to a first embodiment of the present invention.
Figure 2:
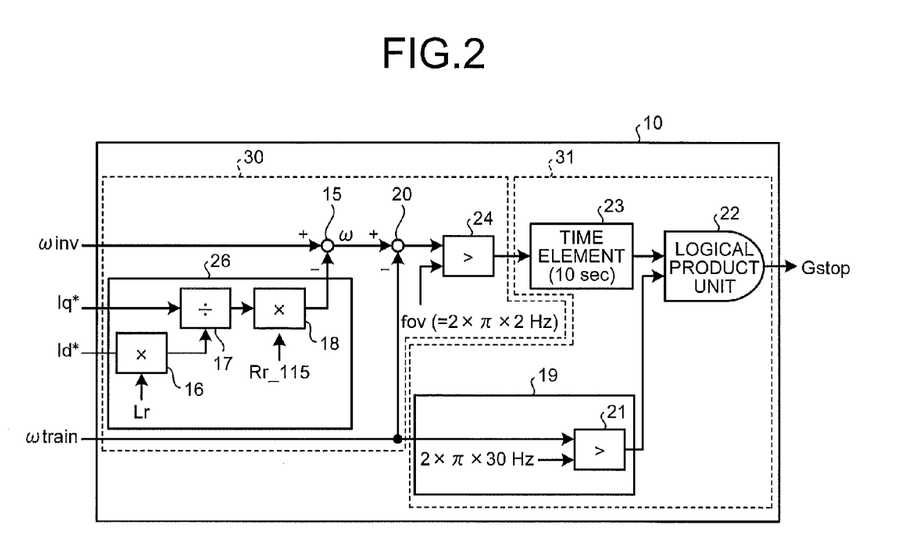
FIG. 2 is a configuration diagram of a drive stopping unit according to the first embodiment of the present invention.

FIG. 1 is a configuration diagram of a power conversion device for an electric vehicle according to a first embodiment of the present invention, and FIG. 2 is a configuration diagram of a drive stopping unit according to the first embodiment of the present invention. In FIG. 1, the power conversion device for an electric vehicle according to the present embodiment includes a power converter 2 that drives an induction machine 1, current detectors 3a, 3b, and 3c, and a control unit 5 as main constituent elements. Furthermore, FIG. 1 depicts the induction machine 1, an external-speed detecting unit 14, a pantograph 12 connected to a DC plus (+) side of the power converter 2, and a wheel 13 connected to a DC minus (−) side of the power converter 2.

The external-speed detecting unit 14 is connected to the wheel 13 for detecting the speed of an electric vehicle; however, the external-speed detecting unit 14 is provided as a system for displaying a speed meter in a cab and displaying a speed on a speed display device. The current detectors 3a, 3b, and 3c detect phase currents Iu, Iv, and Iw generated in the induction machine 1. Although FIG. 1 depicts a case where an AC side current detectors 3 detect, by a CT or the like, currents flowing through connections that connect the power converter 2 and the induction machine 1, the current detectors 3 can also detect phase currents using a current flowing through the power converter 2 such as a bus current using other well-known techniques. Because a relation Iu+Iv+Iw=0 is established, it is also possible to obtain a w-phase current from detection currents of two phases u and v. Therefore, the w-phase current detector 3c may be omitted. It is of course possible to obtain a v-phase current from detection currents of the two phases u and w.

A configuration of the control unit 5 is described next. The control unit 5 includes a dq/uvw-phase converting unit 9, a voltage-command calculating unit 8, a current-command calculating unit 4, an operation instructing unit 11, a PWM control unit 6, an integrating unit 7, and a drive stopping unit 10 as main constituent elements.

As is commonly known, the dq/uvw-phase converting unit 9 requires a control coordinate axis when a three-phase current is coordinate-converted into rotation orthogonal two axes. If a phase of the control coordinate axis is defined as θ, the phase θ is a value obtained by integrating a motor speed ω by the integrating unit 7. The dq/uvw-phase converting unit 9 coordinate-converts phase currents Iu, Iv, and Iw obtained from the current detectors 3 into a d-axis-current detection value Id and a q-axis-current detection value Iq on rotation orthogonal two axes (d-axis and q-axis) (hereinafter, "rotation two axes coordinates"). The d-axis-current detection value Id and the q-axis-current detection value Iq having been coordinate-converted are input to the voltage-command calculating unit 8.

The external-speed detecting unit 14 detects the speed of an electric vehicle, and the detected speed of the electric vehicle is input to the operation instructing unit 11. The operation instructing unit 11 converts from one unit to another so that the input speed of the electric vehicle is input to the drive stopping unit 10. For example, if a unit of the detected speed of the electric vehicle is [km/h], the operation instructing unit 11 multiplies the speed by a coefficient to convert the unit to ωtrain [rad/sec], and the speed is input to the drive stopping unit 10 as train speed information ωtrain.

The operation instructing unit 11 outputs a torque command τ* to the current-command calculating unit 4, and the current-command calculating unit 4 calculates a q-axis current command Iq* using the torque command τ* from the operation instructing unit 11, a secondary magnetic flux command φ* that can be determined from a motor constant and characteristics of the induction machine 1, and the motor constant (a mutual inductance M of a motor, a secondary inductance Lr of the motor, and the number of pole pairs P) as shown in an equation (1).

$$Iq^* = \frac{\tau^*}{\phi^*} \times \frac{Lr}{M} \times \frac{1}{P} \quad (1)$$

The current-command calculating unit 4 also calculates a d-axis current command Id* from the secondary magnetic flux command and the mutual inductance M of the motor that is the motor constant as shown in an equation (2).

$$Id^* = \frac{\phi^*}{M} \quad (2)$$

The q-axis current command Iq* and the d-axis current command Id* calculated by the current-command calculating unit 4 are input to the voltage-command calculating unit 8.

A calculation performed by the voltage-command calculating unit 8 is described below using equations (3) to (11). First, the voltage-command calculating unit 8 calculates, by the equation (3), a slip angular frequency command ωs* using the q-axis current command Iq*, the d-axis current command Id*, and the motor constant of the induction machine 1 (the secondary inductance Lr of the motor and a secondary resistance value Rr of the motor).

$$\omega s^* = \frac{Iq^*}{Id^*} \times \frac{Rr}{Lr} \quad (3)$$

The voltage-command calculating unit 8 calculates differential values dpds, dpqs, dpdr, and dpqr of the magnetic flux estimation values by the equation (4) based on the inputs such as an-inverter angular frequency ωinv, the d-axis-current detection value Id, the q-axis-current detection value Iq, the d-axis current command Id*, the q-axis current command Iq* described above, and a d-axis voltage command Vd* and a q-axis voltage command Vq*, a primary d-axis magnetic flux estimation value pds, a primary q-axis magnetic flux estimation value pqs, a secondary d-axis magnetic flux estimation value pdr, a secondary q-axis magnetic flux estimation value pqr and the motor angular frequency ω calculated by a calculating unit thereof not shown in FIG. 1.

$$\begin{cases} dpds = a11 \times pds + \omega inv \times pgs + a12 \times pdr + Vd^* \\ dpqs = -\omega inv \times pds + a11 \times pqs + a12 \times pqr + Vq^* \\ dpdr = a21 \times pds + a22 \times pdr + (\omega inv - \omega) \times pqr \\ dpqr = a21 \times pqs - (\omega inv - \omega) \times pdr + a22 \times pqr \end{cases} \quad (4)$$

$$a11 = \frac{Lr \times Rs}{Ls \times Lr - M^2}, a12 = \frac{M \times Rs}{Ls \times Lr - M^2},$$

$$a21 = \frac{M \times Rr}{Ls \times Lr - M^2}, a22 = -\frac{Ls \times Rr}{Ls \times Lr - M^2}$$

The voltage-command calculating unit 8 integrates the differential values dpds, dpqs, dpdr, and dpqr of the magnetic flux estimation values of the equation (4), thereby calculating the magnetic flux estimation values pds, pqs, pdr, and pqr by the equation (5).

$$\begin{cases} pds = \int dpds \cdot dts \\ pqs = \int dpqs \cdot dt \\ pdr = \int dpdr \cdot dtr \\ pqr = \int dpqr \cdot dt \end{cases} \quad (5)$$

The voltage-command calculating unit 8 calculates a d-axis current estimation value ids and a q-axis current estimation value iqs by the equation (6) based on the magnetic flux estimation values pds, pqs, pdr, and pqr.

$$\begin{cases} ids = \frac{Lr \times pds - M \times pdr}{Ls \times Lr - M^2} \\ iqs = \frac{Lr \times pqs - M \times pqr}{Ls \times Lr - M^2} \end{cases} \quad (6)$$

The voltage-command calculating unit 8 calculates a d-axis current error vector eid and a q-axis current error vector eiq by the equation (7) from the d-axis and q-axis current estimation values ids and iqs, and from d-axis and q-axis-current detection values id and iq.

$$\begin{cases} eid = ids - id \\ eiq = iqs - iq \end{cases} \quad (7)$$

The voltage-command calculating unit 8 inputs the d-axis and q-axis current error vectors eid and eiq, and the secondary d-axis and q-axis magnetic flux estimation values pdr and pqr, and calculates a rotor rotation acceleration/deceleration calculation value aω by the equation (8). In the equation (8), kap represents a rotor rotation acceleration/deceleration calculation proportion gain, Tapi represents a rotor rotation acceleration/deceleration integration time constant, and s represents a Laplace operator.

$$a\omega = kap\left(1 + \frac{1}{Tapi \cdot S}\right) \cdot \frac{pdr \times eid - pqr \times eiq}{pdr^2 + pqr^2} \quad (8)$$

The voltage-command calculating unit 8 integrates the rotor rotation acceleration/deceleration calculation value aω calculated by the equation (8), and calculates the motor angular frequency ω by an equation (9).

$$\omega = \int a\omega \cdot dt \quad (9)$$

The voltage-command calculating unit 8 calculates, by the equation (10), the inverter angular frequency ωinv corresponding to a frequency of a voltage command that is an output by the power converter 2 from the slip angular frequency command ωs* by the equation (3) and the motor angular frequency ω by the equation (9).

$$\omega inv = \omega + \omega s^* \quad (10)$$

The voltage-command calculating unit 8 calculates the d-axis voltage command Vd* and the q-axis voltage command Vq* on the rotation two axes by the equation (11) based on the inverter angular frequency ωinv, the q-axis current command Iq*, and the d-axis current command Id*.

$$Vd^* = Rs \times Id^* - \omega inv \times \sigma \times Ls \times Iq^*$$

$$Vq^* = Rs \times Iq^* + \omega inv \times Ls \times Id^* \quad (11)$$

The voltage-command calculating unit 8 outputs, to the PWM control unit 6, the d-axis voltage command Vd* and the q-axis voltage command Vq* calculated by the equation (11), and outputs the inverter angular frequency ωinv calculated by the equation (10) to the integrating unit 7.

As is commonly known, when a three-phase voltage or a three-phase current is coordinate-converted into the rotation orthogonal two axes, control coordinate axes are required; however, the integrating unit 7 calculates a phase θ of a control coordinate axis that is rotation two axes coordinates based on an arbitrary angular frequency ωinv. The phase θ is obtained by integrating the inverter angular frequency ωinv as shown in an equation (12).

$$\theta = \int \omega inv \cdot dt \quad (12)$$

The PWM control unit 6 calculates three-phase voltage commands Vu*, Vv*, and Vw* (see the equation (8)) using the d-axis voltage command Vd* and the q-axis voltage command Vq* obtained by the equation (5), and the phase θ obtained by the equation (6); however, because a voltage phase θv of the voltage command slightly further advances than the phase θ, the PWM control unit 6 calculates it from the following equation (13).

$$\theta v = \theta + \tan^{-1}\left(\frac{Vq^*}{Vd^*}\right) \quad (13)$$

The PWM control unit 6 calculates the three-phase voltage commands Vu*, Vv*, and Vw* by an equation (14) based on the voltage phase θv, the d-axis voltage command Vd*, and the q-axis voltage command Vq* obtained by the equation (13).

$$\begin{pmatrix} Vu^* \\ Vv^* \\ Vw^* \end{pmatrix} = \sqrt{(Vd)^2 + (Vq)^2} \begin{pmatrix} \cos(\theta v) \\ \cos\left(\theta v - \frac{2}{3}\pi\right) \\ \cos\left(\theta v + \frac{2}{3}\pi\right) \end{pmatrix} \quad (14)$$

The PWM control unit 6 calculates gate signals based on the three-phase voltage commands Vu*, Vv*, and Vw* and outputs results of the calculation to the power converter 2 so that the power converter 2 can perform a pulse width control. As a result, the power converter 2 controls the induction machine 1 according to the torque command τ*.

The drive stopping unit 10, which is the most important constituent element, is described next. In FIG. 2, the drive stopping unit 10 inputs the inverter angular frequency ωinv, the q-axis current command Iq*, the d-axis current command Id*, and the train speed information ωtrain, and detects a temperature rise of a secondary resistance of the induction machine 1, and when the temperature rise is abnormal, the drive stopping unit 10 outputs a drive stopping signal Gstop to stop the driving operation of the power converter 2. The drive stopping unit 10 shown in FIG. 2 includes a secondary-resistance-temperature detecting unit 30 and a drive-stopping-signal output unit 31 as main constituent elements. The secondary-resistance-temperature detecting unit 30 includes a reference-slip-angular-frequency calculating unit 26, a subtractor 15, and a comparator 24. The drive-stopping-signal output unit 31 includes a time element (10 sec) 23, a logical product unit 22, and an abnormality detecting unit (hereinafter, simply "detecting unit") 19 of an external-speed detecting unit.

Although the d-axis current command Id* and the q-axis current command Iq* are used for the calculation of the drive stopping unit 10 in the present embodiment, it is of course possible to use the d-axis-current detection value Id and the q-axis-current detection value Iq.

In the reference-slip-angular-frequency calculating unit 26, a multiplier 16 multiplies the d-axis current command Id* by a value of the secondary inductance Lr of the motor. A divider 17 divides the q-axis current command Iq* by a result of the multiplication. A multiplier 18 multiplies a result of the division by a secondary resistance value Rr_115 of a 115-degree conversion of the motor to calculate a reference slip angular frequency.

The subtractor 15 subtracts the reference slip angular frequency from the inverter angular frequency ωinv. According to this configuration, the motor angular frequency ω is calculated, and a subtractor 20 subtracts the train speed information ωtrain from the motor angular frequency ω.

The comparator 24 compares a result of the subtraction (deviation=motor angular frequency ω−train speed information ωtrain) and an abnormality detection value fov (=2×π×2 Hz), and when the deviation becomes larger than the abnormality detection value fov, it is determined that a fact that the temperature of the secondary resistance of the induction machine 1 abnormally rises has been detected, and the comparator 24 outputs 1. Because a temperature limit value of the induction machine 1 is determined by the motor constant and configuration of the induction machine 1 and the kinds of insulation of material, it is necessary to set the abnormality detection value fov (=2×π×2 Hz) compared by the comparator 24 to a value that enables to detect abnormality before the temperature of the induction machine 1 becomes equal to the temperature limit value.

Figure 3:
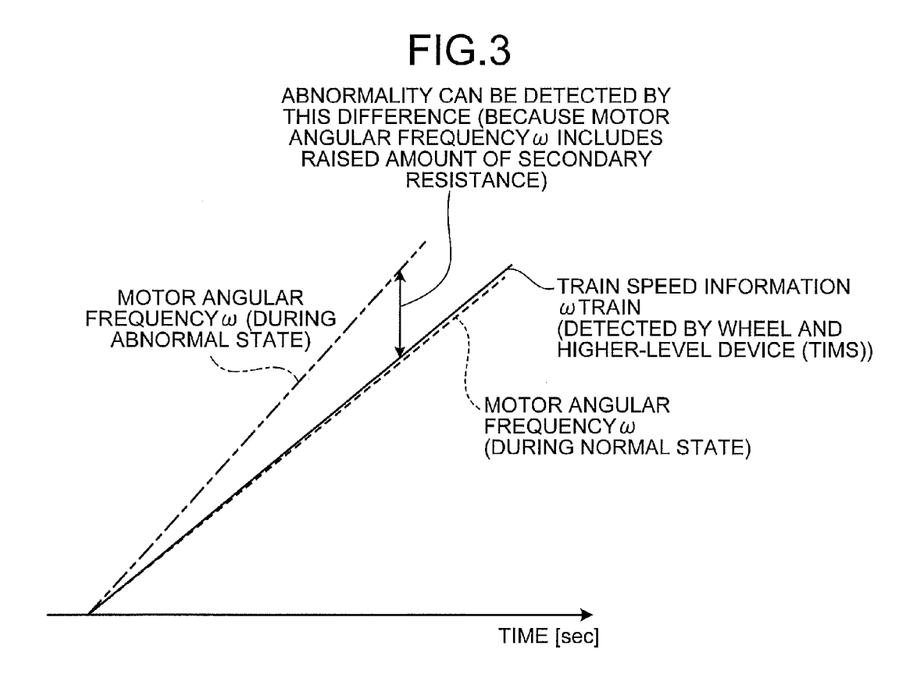
FIG. 3 is a diagram for explaining a principle of detection of an abnormal temperature rise of a secondary resistance according to the first embodiment of the present invention.

FIG. 3 is a diagram for explaining a principle of detection of an abnormal temperature rise of a secondary resistance according to the first embodiment of the present invention. The principle of abnormality detection in the embodiment of the present invention is described below with reference to FIG. 3.

During a normal state, the motor angular frequency ω and the train speed information ωtrain are substantially the same as shown in FIG. 3. However, when the temperature of the secondary resistance of the induction machine 1 rises and the value of the secondary resistance is increased, because the motor angular frequency ω includes this raised amount of the secondary resistance, the motor angular frequency ω becomes a value that is much larger than the train speed information ωtrain. The present invention utilizes this mechanism to detect an abnormal temperature rise of the secondary resistance of the induction machine 1.

In FIG. 2, an output value of the comparator 24 is input to the time element (10 sec) 23, and when an output value 1 of the comparator 24 continues for more than 10 seconds, the time element (10 sec) 23 outputs 1. The reason why the output value of the comparator 24 is input to the time element (10 sec) 23 is that the motor angular frequency ω is largely varied at the time of idling or sliding and the motor angular frequency ω becomes larger than the train speed information ωtrain in some cases. For example, the temperature rise of the induction machine has a time constant of more than 10 seconds, and the speed variation such as idling and sliding is an abrupt variation for about 1 to 2 seconds. By providing the time element (10 sec) 23 utilizing a difference of time constants of these two phenomena, there is an effect that it is possible to prevent a variation in the motor angular frequency ω at a time of idling from being erroneously detected as a temperature rise.

The detecting unit 19 is provided to prevent erroneous detection of temperature rise when the external-speed detecting unit 14 that detects the train speed information ωtrain malfunctions. A comparator 21 of the detecting unit 19 outputs 1 when the train speed information ωtrain exceeds 2×π× 30 Hz. According to this configuration, it is possible to detect an abnormal temperature rise.

The logical product unit 22 takes in a value from the detecting unit 19 and an output value from the time element (10 sec) 23, and when the output value of the detecting unit 19 is 1 and the output value of the time element (10 sec) 23 is 1, the logical product unit 22 outputs the drive stopping signal Gstop for stopping the operation of the power converter 2. The power converter 2 receives the drive stopping signal Gstop and stops the driving operation. When the value from the detecting unit 19 is 1 and the value from the time element 23 is 0, because the value of the secondary resistance of the induction machine 1 is small even when the external-speed detecting unit 14 malfunctions, the logical product unit 22 does not output the drive stopping signal Gstop.

As described above, the power conversion device for an electric vehicle according to the present embodiment includes the drive stopping unit 10. The drive stopping unit 10 detects a temperature rise of the secondary resistance of the induction machine based on the speed information ωtrain, the inverter angular frequency ωinv, the q-axis current command Iq* or the q-axis-current detection value Iq, and the d-axis current command Id* or the d-axis-current detection value Id, and then the drive stopping unit 10 stops the driving operation of the power converter 2 before the temperature of the secondary resistance exceeds the temperature limit value of the induction machine 1. Therefore, it is possible to detect an abnormal temperature rise of a rotor (secondary side) of a motor generated by, for example, clogging of a suction port of a blower. That is, in the sensor-less control of the induction machine 1, even if an abnormal temperature rise of the induction machine 1 is generated, it is possible to detect the abnormal temperature rise. As a result, it is possible to stop the operation of the power converter 2 before the temperature of the secondary resistance of the induction machine 1 exceeds the temperature limit value of the induction machine 1, thereby preventing the motor from malfunctioning, and it is possible to use the induction machine 1 for a long period of time. Furthermore, because the power conversion device for an electric vehicle according to the present embodiment includes the abnormality detecting unit 19 of an external-speed detecting unit, it is possible to prevent an erroneous detection of temperature rise of the secondary resistance of the induction machine 1 when a speed-information detecting unit of a train has an abnormality and the external-speed detecting unit 14 malfunctions. Further, because the power conversion device for an electric vehicle according to the present embodiment includes the time element (10 sec) 23 that outputs 1 when the output value 1 of the comparator 24 continues for more than 10 seconds, even if the motor angular frequency ω is largely varied and becomes larger than the train speed information ωtrain when the idling or sliding is generated, it is possible to avoid a case where the variation of the motor angular frequency ω caused by idling or the like is erroneously detected as a temperature rise of the secondary resistance of the induction machine 1.

Second Embodiment

Figure 4:
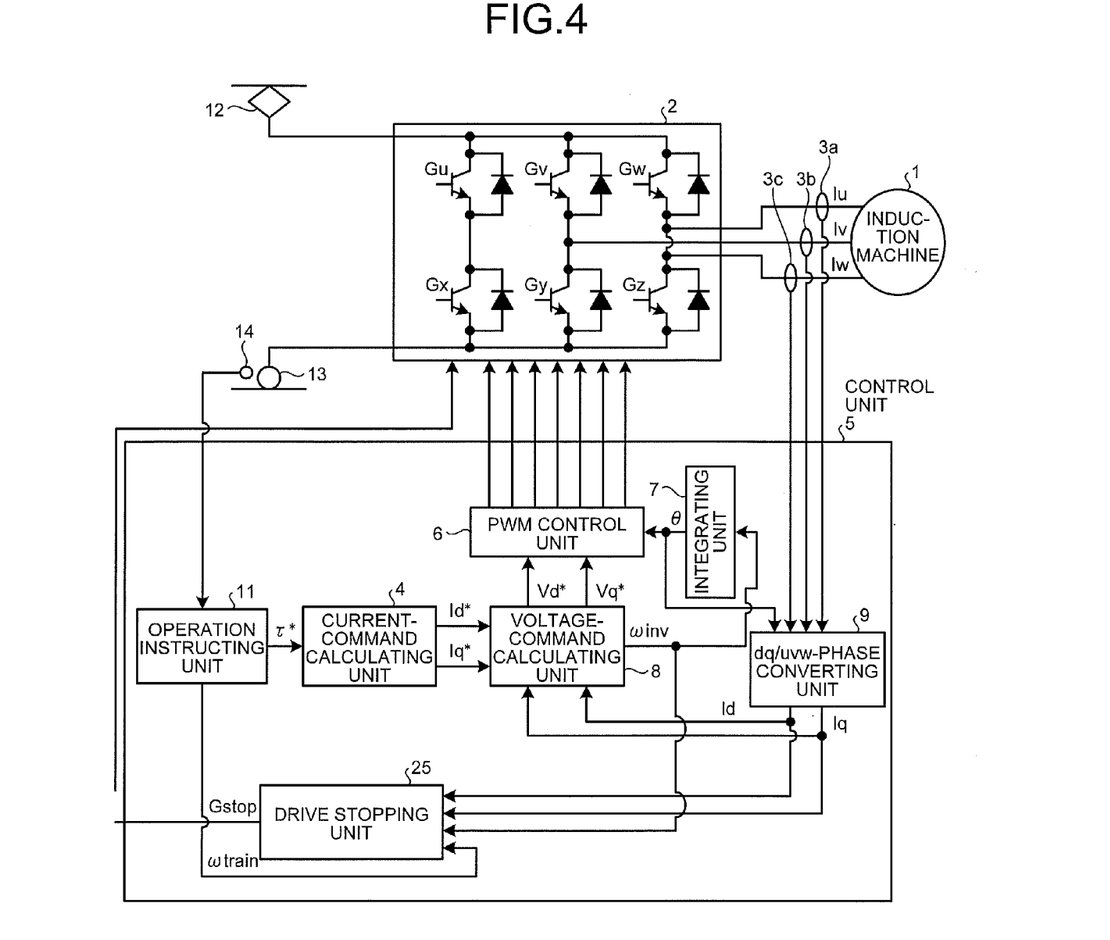
FIG. 4 is a configuration diagram of a power conversion device according to a second embodiment of the present invention.
Figure 5:
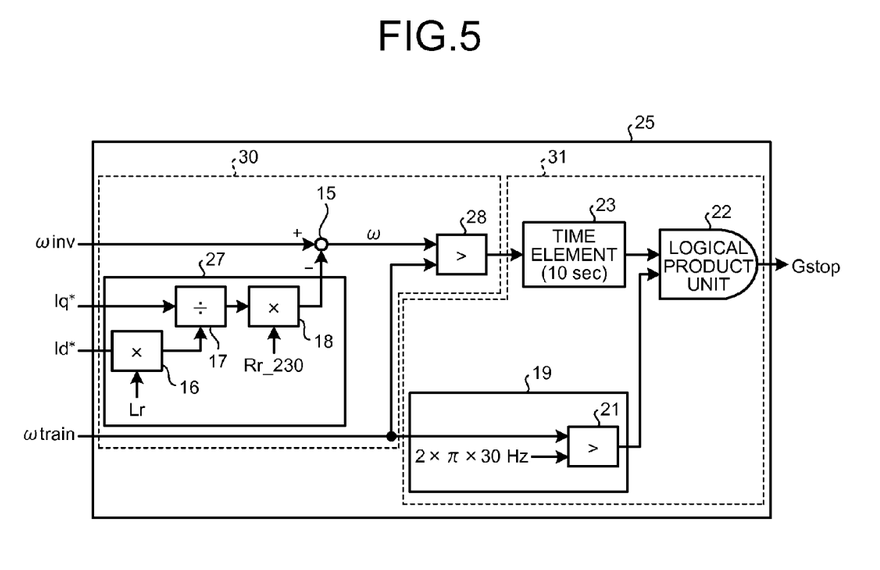
FIG. 5 is a configuration diagram of a drive stopping unit according to the second embodiment of the present invention.

FIG. 4 is a configuration diagram of a power conversion device for an electric vehicle according to a second embodiment of the present invention, and FIG. 5 is a configuration diagram of a drive stopping unit according to the second embodiment of the present invention. Elements identical to those described in the first embodiment are denoted by like reference signs and explanations thereof will be omitted, and only elements different from the first embodiment are described below.

In FIG. 4, in the second embodiment, a drive stopping unit 25 is the different part as compared with the configuration of the first embodiment. In the drive stopping unit 25 shown in FIG. 5, the configuration of a reference-slip-angular-frequency calculating unit 27 is different as compared with the drive stopping unit 10 according to the first embodiment. The second embodiment is characterized such that when a secondary resistance value used for the calculation of the reference-slip-angular-frequency calculating unit 27 is set to 240 degrees that is the temperature limit value of a motor, for example, a secondary resistance value Rr_230 corresponding to the motor temperature 230-degree c that is lower than the temperature limit value of the motor is used. As a result, the drive stopping unit 25 does not require the subtractor 20 as compared with the drive stopping unit 10 according to the first embodiment.

More specifically, the subtractor 15 subtracts a reference slip angular frequency from the reference-slip-angular-frequency calculating unit 27 from the inverter angular frequency ωinv. By this subtraction, the motor angular frequency ω can be obtained. A comparator 28 compares the motor angular frequency ω and the speed information ωtrain, and when the motor angular frequency ω becomes larger than the speed information ωtrain, it is determined that the temperature of the secondary resistance of the induction machine 1 is detected as being close to the temperature limit value of the motor, and the comparator 28 outputs 1. The temperature limit value of the motor mentioned above is an example, and the value can be set arbitrarily according to the configuration or the like of the induction machine 1.

In the present embodiment, the d-axis-current detection value Id and the q-axis-current detection value Iq are used for the calculation of the reference-slip-angular-frequency calculating unit 27 of the drive stopping unit 25; however, even when the d-axis current command Id* and the q-axis current command Iq* are used, identical effects can be obtained.

As described above, the power conversion device for an electric vehicle according to the present embodiment detects a temperature rise of a secondary resistance of an induction machine based on the speed information ωtrain, the inverter angular frequency ωinv, the q-axis current command Iq* or the q-axis-current detection value Iq, the d-axis current command Id* or the d-axis-current detection value Id, and the secondary resistance value Rr that is set lower than the temperature limit value of the motor. Therefore, similarly to the first embodiment, in the speed sensor-less control of the induction machine 1, it is possible to detect an abnormal temperature rise of a rotor (secondary) of a motor generated by clogging of a suction port of a blower so as to stop the operation of the power converter 2 before the temperature of the secondary resistance of the induction machine 1 exceeds the temperature limit value of the induction machine 1, thereby preventing the motor from malfunctioning. In addition, as compared with the first embodiment, it is possible to reduce the calculation amount of software.

Although the train speed information ωtrain is used in the first and second embodiments, information used in the present invention is not limited thereto, and it is of course possible to use speed information obtained from a speed detecting unit incorporated in an electric vehicle other than a train. Furthermore, as an example, in the first and second embodiments, a resistance value corresponding to the motor temperature 115-degree c or 230-degree c is used as the secondary resistance value Rr of the motor, 2×π×2 Hz is used as the abnormality detection value fov, and 30 Hz×2π is used as a value of the comparator 21; however, the present invention is not limited to these values.

INDUSTRIAL APPLICABILITY

As described above, the present invention can be applicable to a power conversion device for an electric vehicle or the like, such as a railway vehicle and an electric car, and the present invention is useful as an invention capable of preventing a motor from malfunctioning by detecting an abnormal temperature rise of a rotor of a motor and stopping an operation of a power converter.

REFERENCE SIGNS LIST

1 Induction Machine
2 Power Converter
3a, 3b, 3c Current Detector
4 Current-Command Calculating Unit
5 Control Unit
6 PWM Control Unit
7 Integrating Unit
8 Voltage-Command Calculating Unit
9 dq/uvw-Phase Converting Unit
10, 25 Drive Stopping Unit
11 Operation Instructing Unit
12 Pantograph
13 Wheel
14 External-Speed Detecting Unit
15, 20 Subtractor
16, 18 Multiplier
17 Divider
19 Abnormality Detecting Unit of External-Speed Detecting Unit
21, 24, 28 Comparator
22 Logical Product (AND) Unit
23 Time Element (10 sec)
26, 27 Reference-Slip-Angular-Frequency Calculating Unit
30 Secondary-Resistance-Temperature Detecting Unit
31 Drive-Stopping-Signal Output Unit
fov Abnormality Detection Value
Gstop Drive Stopping Signal
Id d-Axis-Current Detection Value
Id* d-Axis Current Command
Iq q-Axis-Current Detection Value
Iq* q-Axis Current Command
Iu, Iv, Iw Phase Current
Lr Secondary Inductance of Motor
Rr Secondary Resistance Value of Motor
Vd* d-Axis Voltage Command
Vq* q-Axis Voltage Command
θ Phase
τ* Torque Command
ω Motor Angular Frequency
ωinv Inverter Angular Frequency
ωtrain Train speed Information

The invention claimed is:

1. A power conversion device for an electric vehicle, comprising:
a power converter that drives an induction machine; and
a control unit that controls the power converter, wherein
the control unit includes a drive stopping unit, and
the drive stopping unit includes
a secondary-resistance-temperature detecting unit that detects temperature rise of a secondary resistance of the induction machine based on a slip angular frequency of the induction machine calculated based on a current detected by the induction machine and on a motor constant of the induction machine, speed information of the induction machine calculated based on the current, and speed information of an electric vehicle detected by an external-speed-information detecting unit, and
a drive-stopping-signal output unit that includes a time element that detects that temperature rise of the secondary resistance continues for more than a predetermined time element by an output from the secondary-resistance-temperature detecting unit, and outputs a drive stopping signal for stopping a driving operation of the power converter based on an output from the time element and the speed information of the electric vehicle.

2. The power conversion device for an electric vehicle according to claim 1, wherein
the drive-stopping-signal output unit includes an abnormality detecting unit that recognizes that the external-speed-information detecting unit has malfunctioned when the speed information of the electric vehicle is equal to or higher than a predetermined value, and
the drive-stopping-signal output unit outputs the drive stopping signal based on an output from the time element and an output from the abnormality detecting unit.

* * * * *